United States Patent [19]

Embree et al.

[11] 4,276,448

[45] Jun. 30, 1981

[54] ELECTRONIC TONE RINGER

[75] Inventors: Milton L. Embree; David C. Goldthorp, both of Reading, Pa.; David R. Vogelpohl, Indianapolis, Ind.

[73] Assignee: Bell Telephone Laboratories, Incorporated, Murray Hill, N.J.

[21] Appl. No.: 67,718

[22] Filed: Aug. 20, 1979

[51] Int. Cl.³ .............................................. H04M 1/00
[52] U.S. Cl. ................................................... 179/84 T
[58] Field of Search ................. 179/84 R, 84 T, 81 C, 179/84 VF

[56] References Cited

U.S. PATENT DOCUMENTS

| | | | |
|---|---|---|---|
| 3,740,490 | 6/1973 | McAlonie et al. | 179/84 T |
| 3,808,379 | 4/1974 | Lind | 179/84 T |
| 3,860,764 | 1/1975 | Martin et al. | 179/84 T |
| 3,867,585 | 2/1975 | Morstadt | 179/84 T |
| 3,965,307 | 6/1976 | Dimmer | 179/84 T |
| 4,081,617 | 3/1978 | Clark | 179/84 T |
| 4,139,740 | 2/1979 | Castleman | 179/81 C |

*Primary Examiner*—Joseph A. Popek
*Attorney, Agent, or Firm*—Samuel R. Williamson

[57] ABSTRACT

An electronic tone ringer responds to ringing signals on a telephone line while being unresponsive to dialing pulses or other signals on the line. Powered directly from the telephone line the ringer uses current sources (223-226) to provide a high impedance to the ringer circuitry and an insensitivity to line voltage variations so that reliable operation of the ringer is maintained on long loops and with multiple ringers terminated on the line. A multitone signal for activating an electroacoustic transducer (300) is provided by frequency modulating a single oscillator (500) within the tone ringer.

18 Claims, 4 Drawing Figures

ELECTRONIC TONE RINGER

TECHNICAL FIELD

This invention relates to tone ringers, and more particularly, to the type tone ringer that may be used in a telephone system.

BACKGROUND OF THE INVENTION

The use of the conventional electromechanical bell ringer has been the primary signaling device used in telephones for a great number of years. In recent years, however, tone ringers considered to be more desirable have been replacing the electromechanical bell ringer due to advances in electronic technology. The tone ringers provide a signal generally considered substantially more pleasing to the average ear than the jangle of an electromechanical bell ringer. Also, space requirements through use of tone ringers are minimized. These tone ringers comprise electronic circuitry that responds to conventional low frequency power ringing signals on a telephone line, and also a tone generating transducer that provides an alerting signal to a telephone subscriber. An example of such a tone ringer is disclosed in U.S. Pat. No. 3,740,490, issued to R. F. McAlonie et al., on June 19, 1973.

Telephone ringers have to operate over a loop whose length can vary considerably. Although more efficient than electromechanical bell ringers, tone ringers of the prior art are optimized to operate over loops not exceeding a certain length since the ringers have an operational voltage range. Telephone extensions with ringers increase the load presented to the ringing voltage resulting in a further decrease in the available voltage. Thus, the value of the current available to the tone ringer is a critical, sensitive factor, particularly so in those instances where multiple sets are terminated on a line. It is desirable, therefore, to provide a tone ringer which allows for efficient operation over a wide range of loop lengths and multiple extensions being terminated on the telephone line.

SUMMARY OF THE INVENTION

In accordance with the invention, there is provided a tone ringer to which power is provided through use of constant current generators for optimum performance over a wide range of loop lengths and supply voltage levels. Use of transistors as constant current generators biased with fixed resistors and unbypassed emitters supply a fixed value of current independent of the supply voltage through a wide operational range. The current value is established by the base voltage and the emitter resistor, and a high impedance is presented at the collector. Connection of two such generators, an NPN transistor and a PNP transistor, so that they are complementary disposed across a line facilitates driving of the tone ringer circuit components with a constant current and at the same time provides a high impedance to both sides of the circuit components.

According to the present invention the tone ringer circuit also comprises sensing means for distinguishing between valid ringing signals and unwanted transients, oscillatory generator means for energizing an output transducer through output circuit means, frequency determining means for varying the frequency of the oscillatory generator means and power conversion means for deriving ringing power from the input ringing signal. Organization of the circuit is such that implementation in the form of an integrated circuit is accomplished with a minimum number of external components.

The sensing means operates to distinguish between valid and invalid ringing signals by considering the relative duration of the ringing signal above a fixed voltage level. This function is accomplished by first comparing and then integrating the input voltage. During the interval an input voltage exceeding a first voltage reference level is presented, a capacitor is charged by a first current source. Otherwise, it is discharged by a second current source. If the input voltage is caused by a valid ringing signal, the capacitor will charge to a voltage exceeding a second voltage reference level, at which time the tone ringer circuit is activated and the transducer will sound. If the input voltage is caused by a dial pulse or switchhook transient, the capacitor does not charge sufficiently to exceed the second voltage reference and the transducer is inhibited from sounding. Thus conventional ringing signals will be able to activate the tone ringer and cause an audible output signal, but transients and pulses up to several hundred volts will be unable to do so.

The oscillatory generator means determines the frequency and duty cycle of the signal which drives the transducer. Power for the oscillatory generator is derived through constant current generators from the input ringing signal. Amplitude modulation of the signal to the transducer is also provided by the input ringing signal. The oscillatory generator means has a resistor-capacitor combination which sets the frequency of the signal generated while the duty cycle is set by the ratio of two of the constant current generators. The fundamental frequency of the oscillator is changeable by adjusting the resistor or capacitor values while maintaining the same duty cycle.

To provide a distinctive ringing capability in accordance with the invention, in one operating condition the fundamental frequency of the oscillatory generator means is altered by the frequency determining means. The fundamental frequency is altered by a fractional relationship such as a 5/4 ratio for the negative half-cycle of the input ringing voltage. This provides the option of having a frequency-shift type output signal in addition to the standard amplitude-modulated output signal. The duty cycle remains unchanged during production of the frequency-shift signal.

The power conversion means serves to convert input ringing signals to the energy needed to provide the reference voltages for the circuit, power for the current generators, and power to the transducer. Power is supplied to the transducer separate from that supplied to the current generators which in turn power the tone ringer circuit components. Separation of the power for the two allows for better regulation of the current generators and adequate amplitude modulation of the transducer signal.

BRIEF DESCRIPTION OF THE DRAWING

This invention will be more fully comprehended from the following description and the accompanying drawing in which.

DETAILED DESCRIPTION

Figure 1:
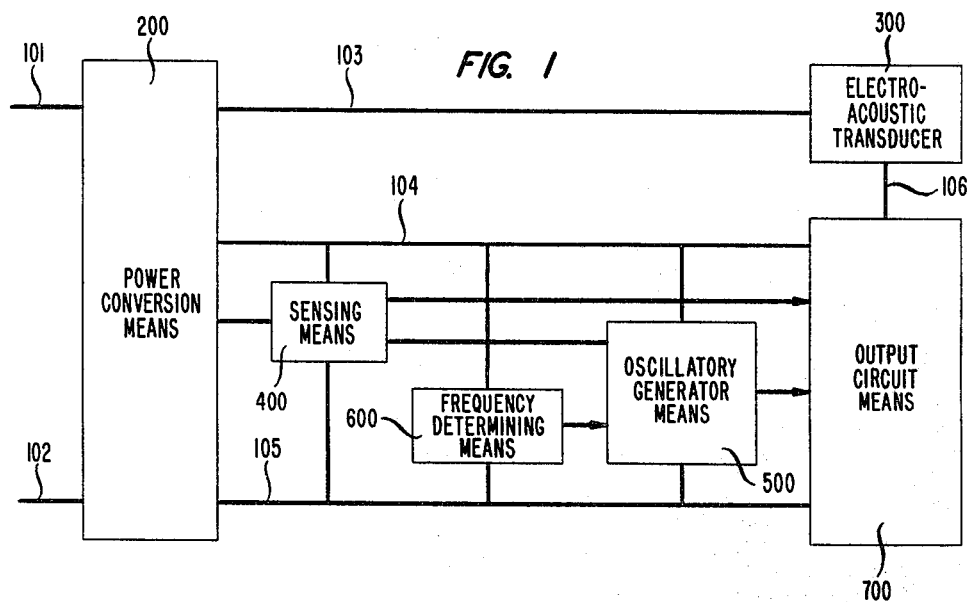
FIG. 1 is a block diagram of an electronic tone ringer showing the major functional circuit components of the ringer and their general interconnection with each other in accordance with the present invention.
Figure 4:
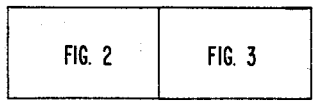
FIG. 4 illustrates the spacial arrangement of FIGS. 2 and 3.

FIG. 1 is a functional block representation of a tone ringer operative in accordance with the principles of the invention. As shown, the ringer comprises power conversion means 200 connected to a pair of input lines 101 and 102 over which incoming ringing signals are received. The power conversion means 200 serves to rectify the incoming ringing signal and provide a source of power to the remainder of the tone generating circuitry. Voltage limiting circuitry is also included to limit the maximum voltage that is developed across the remainder of the circuitry. In addition, the power conversion means 200 provides a source of voltage over line 103 to drive the electroacoustic transducer 300.

Connected across the output lines 104 and 105 of power conversion means 200 is sensing means 400 which determine the presence of a valid input ringing signal. Discrimination between valid ringing signals and dial pulses or switchhook transients is determined by the persistence of the input signal voltage above a reference voltage level.

Also connected across lines 104 and 105 is oscillatory generator means 500 which produces the signal that drives output circuit means 700. The frequency at which the oscillatory generator means 500 operates is controlled by frequency determining means 600. In one operating condition the frequency determining means allows the oscillatory generator means to operate at a fundamental frequency and this frequency is coupled to the transducer via an output circuit means 700. In a second operating condition the frequency determining means 600 will cause the oscillatory generator means 500 to provide a frequency-shifted output signal which is applied through output circuit means 700 to the transducer 300. Included in the output circuit means 700 is a latch which, when enabled by the sensing means 400, is switched on and off at a rate determined by the oscillatory generator means 500. When activated both by the sensing means 400 and oscillatory generator means 500, the output circuit means 700 provides a path for current to flow from the transducer over line 106 to line 105.

Figure 2:
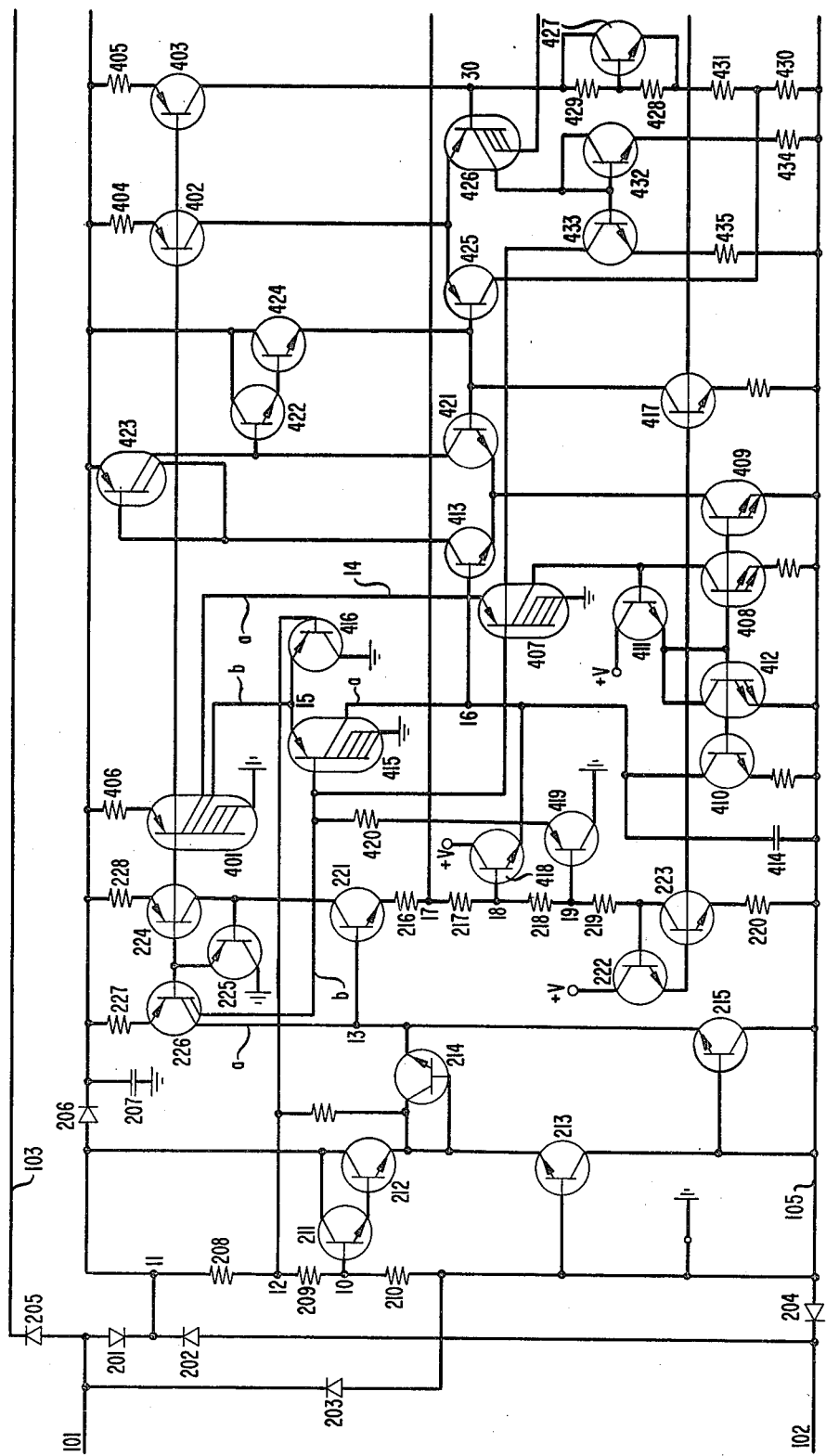
FIGS. 2 and 3 present a schematic diagram showing the detailed circuitry of an embodiment of the electronic tone ringer in accordance with the invention.

Referring now to FIG. 2, there is shown a schematic diagram of the detailed circuitry of the tone ringer of FIG. 1. The input ringing signal appearing on lines 101 and 102 is coupled into the power conversion means 200 to a diode bridge consisting of diodes 201 through 204 and also diode 205. Coupled to diode 205 is an electroacoustic transducer 300 and an output circuit means 700 which will be discussed later. One output from the diode bridge is connected to a diode 206 which in combination with a capacitor 207 couples power to the tone ringer circuit components. The diode bridge output also has a resistor divider network comprising resistors 208, 209 and 210 attached thereto. One tap on this resistor divider network indicated as node 10 leads to a Darlington transistor configuration 211 and 212 which feeds a voltage regulator formed by transistors 213, 214 and 215. Transistors 213 and 215 operate as Zener diodes by virtue of the reverse breakdown of their base emitter junctions. These transistors serve several functions. In conjunction with resistors 208, 209 and 210 and transistors 211 and 212, they limit the maximum voltage at node 11 to a specific level. This limit provides a safe margin under the maximum allowable voltage for the standard buried collector technology used in making the tone ringer integrated circuit. Secondly, at node 12 they provide a voltage which is used as an input to the sensing means 400, also to be discussed later. Finally, transistor 215 provides a voltage reference used to determine the current in all of the current sources in the tone ringer circuit.

Established by transistor 215, the voltage at node 13 sets up a current which is determined by resistors 216 through 220 and the base-emitter drops of transistors 221, 222 and 223. The emitter current of transistor 221 (minus its negligible base current) is the emitter current of transistor 224 (neglecting the small base currents of transistors 224 and 225). Transistors 224, 225 and 226 and in the sensing means 400 transistors 401, 402 and 403 then form a current mirror where the emitter current of transistor 224 is reflected or ratioed in the emitters of the transistors of the mirror according to the value of the resistor in their respective emitter leads. Thus the currents in the emitter leads of transistors 226, 402 and 403 are twice the current in the emitter of transistor 224 because of their respective emitter resistors 227, 404 and 405 being half the value of resistor 228 while the emitter current of transistor 401, by virtue of resistor 406 being two times the value of resistor 228, is half the current in transistor 224. It should be noted that the number of equal area collectors for each transistor is shown by its number of collector leads. Transistor 225 is used as a helper transistor to supply the base drive for the current mirror. Because transistor 226 has a split collector with equal areas, the collectors, designated "a" and "b", will each have half the total emitter current flowing therein. Moreover, the emitter current of transistor 401 is divided into five equal parts via its five collectors with three-fifths of the current being shunted to the common node and one-fifth to each of nodes 14 and 15.

Following the teaching of T. M. Frederiksen, W. M. Howard and D. M. Monticelli in their paper entitled "A Single-Chip, All Bipolar, Camera Control IC," presented at the 1977 IEEE International Solid State Circuits Conference, Feb. 18, 1977 and reprinted in the *ISSCC Digest of Technical Papers,* pages 214 and 215, the emitter current of transistor 407 is divided into five equal parts, four of those parts being shunted to common and the remaining part coupled to the collector of transistor 408. This transistor along with transistors 409 and 410 form another current mirror with transistor 411 serving as the helper transistor. Transistor 412 is used to equalize the base currents of transistors 411 and 413 so as to compensate, via the collector current of transistor 410, for the base current of transistor 413. This current adds significantly to the discharge current of capacitor 414 if the gain of the transistors should be low. The emitter currents of transistors 409, 410 and 412 have specific values determined by the relative size of their emitter junctions (indicated by the number of emitter leads) and the values of the resistors in their emitters.

Collector b of transistor 401 is tied to the emitters of a transistor differential pair, 415 and 416, which form a comparator with one of the pair always turned on. When transistor 416 is on, the current from collector b of transistors 401 is shunted to common while when transistor 415 is on, four-fifths of the collector b current of transistor 401 is shunted to common and one-fifth of the current flows into node 16 and serves to charge capacitor 414.

The collector current of transistor 224 is essentially the emitter current of transistor 223 (neglecting base currents). Transistor 223 forms a current mirror with transistor 417 on FIG. 2 and transistors 501, 601, 502 and 503 on FIG. 3. Transistor 222 is used as the helper transistor for this current mirror.

Operation of the sensor means depends on the value of the voltage at node 12 and the voltage on capacitor 414. As soon as an input voltage of sufficient magnitude is applied, transistor 215 starts regulating and the current sources are powered. Transistor 215 is held in regulation by the current in collector a of transistor 226. Constant voltages are then set up along the resistor string 216 through 219 which are tapped as voltage references. The reference at node 17 is used in the oscillatory generator means 500, to be discussed later, and the reference at node 18, which connects to transistor 418, sets the minimum voltage that capacitor 414 is allowed to charge to. Node 19 furnishes a reference voltage to the base of transistor 419. Shifted by the current in collector b of transistor 226 through resistor 420, transistor 419 provides a voltage on the base of transistor 415 when transistor 433 is off. Transistor 416 has its base tied to node 12 which is a ratio of the full wave rectified input voltage.

As previously indicated, the transistor differential pair 415 and 416 controls the charging of capacitor 414. When the voltage at node 12 is lower than the reference on the base of transistor 415, then transistor 416 is on, 415 is off, and the current in collector b of transistor 401 flows to common. During this time, capacitor 414 is discharged by the collector current of transistor 410. When the voltage on node 12 is higher than the voltage on the base of transistor 415, however, transistor 415 will be on, 416 will be off, and the current in collector a of transistor 415, minus the current of transistor 410, is used to charge capacitor 414. The voltage across capacitor 414 will rise in a triangular wave fashion dictated by the amount of time that the voltage at node 12 is greater than that at the base of transistor 415. By using low charge and discharge currents, capacitor 414 is a relatively small and inexpensive capacitor.

Transistors 409, 413, 417 and 421 through 424 form a unity gain amplifier to buffer the high impedance node 16 to the lower impedance base of transistor 425. A differential pair is formed by transistors 425 and 426. The base of transistor 426 is tied to a reference voltage determined by the constant collector current of transistor 403, a voltage level shifter transistor 427, resistors 428, 429, 430 and 431, and the current in transistor 425.

When the voltage on capacitor 414 is below that on the base of transistor 426, transistor 425 is on, transistor 426 is off, and the collector current of transistor 402 flows through transistor 425 and resistor 430 to ground. This additional current through resistor 430 serves to raise the voltage on the base of transistor 426 and provides circuit hysteresis as follows. When capacitor 414 charges sufficiently to raise the voltage at the base of transistor 425 to approximately that at the base of transistor 426, the transistors switch states and transistor 425 is off and transistor 426 is on. At this point three things occur simultaneously. First, three-fourths of the emitter current of transistor 426 flows to the output circuit means 700, to be discussed later, turning it on and allowing ringing to begin, since at this point the oscillatory generator means 500 is producing a signal. Secondly, one-fourth of the emitter current of transistor 426 flows to the collector and base of transistor 432, which forms a current mirror with transistor 433. The ratio of the emitter resistors 434 and 435, respectively, for transistors 432 and 433 is such that the collector of transistor 433 develops a current which, subtracted from the current in collector b of transistor 226, leaves a low current flowing through resistor 420. This current reduction serves to reduce the reference voltage at the base of transistor 415 to a level that ensures that the ringer stays on once it starts ringing. Such a reduction is necessary, because once the ringer starts operating, the transducer load causes the input ringing voltage to drop on its positive half cycle. Finally and also simultaneously, the collector current flowing in transistor 425 through the resistor 430 ceases reducing the reference voltage at the base of transistor 426 to a level that ensures that the ringer stays on. Thus, once a valid ringing signal is recognized, a positive latch is assured by the reference level shifts. Dial pulse and other transient signals are not detected by this means because their levels and their durations above the reference voltage at the base of transistor 415 are respectively less than or are shorter than the input ringing voltage. Thus capacitor 414 is not charged sufficiently to exceed the reference voltage of node 30 and ringing is inhibited for these signals.

Figure 3:
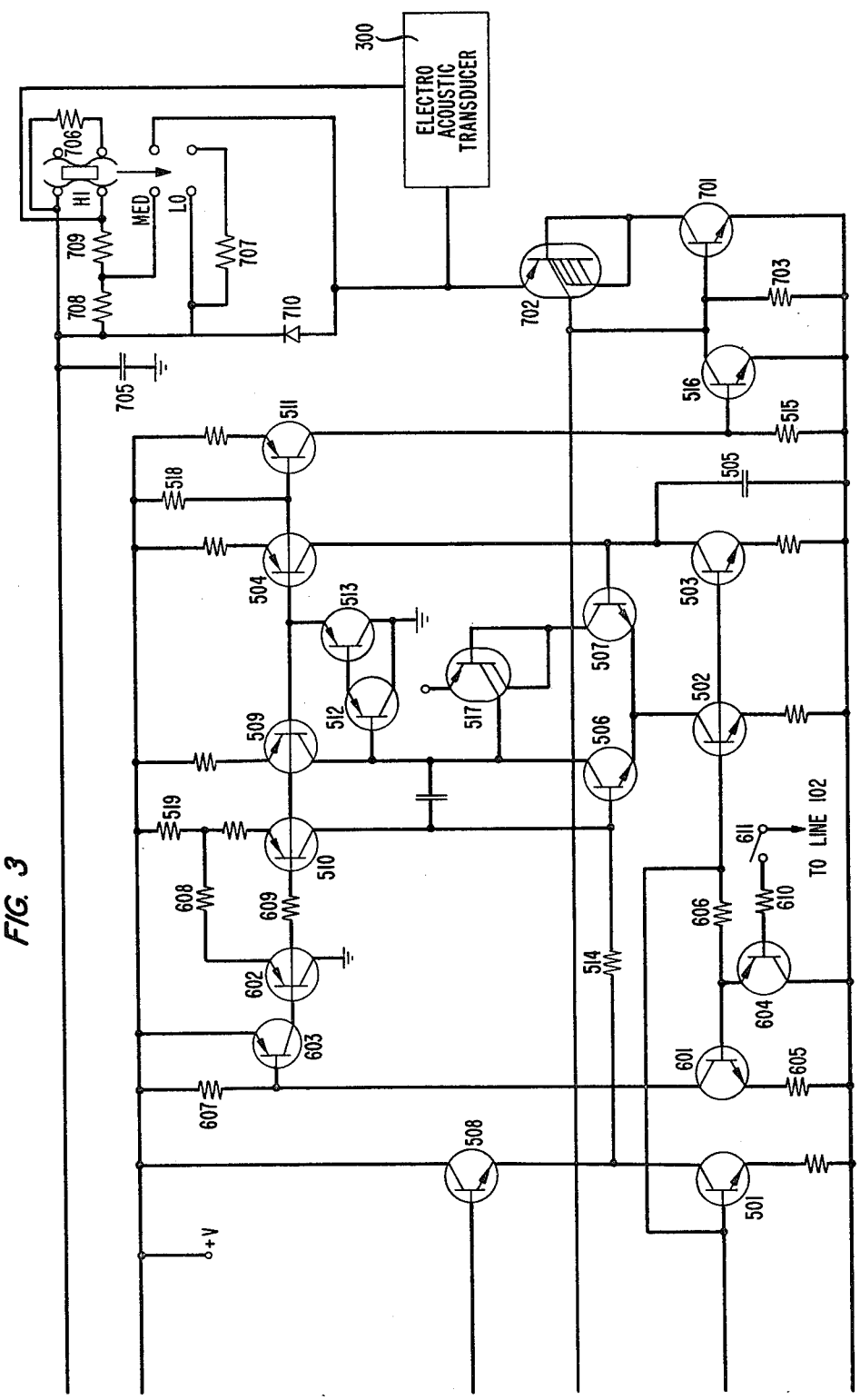

Referring now to FIG. 3, there is seen a schematic representation of the oscillatory generator means 500, frequency determining means 600, and the output circuit means 700 of the tone ringer circuit. The oscillatory generator means 500 functions similarly to the sensing means 400 in that it uses the charge and discharge of a capacitor by constant current sources connected in a complementary configuration to set its frequency and duty cycle. Here capacitor 505 responds to the charging and discharging current sources which are transistors 504 and 503, respectively. Depending on which transistor, 506 or 507, of the differential pair is turned on, capacitor 505 is either charged or discharged. As previously indicated, transistors 501, 502 and 503 are part of the current mirrors formed by transistor 223 shown on FIG. 2.

Transistors 502 and 503 have the same current flowing in their collectors at the time that all the current sources are powered up. If transistor 510 is off, the reference voltage at node 17 shown in FIG. 2 minus the $V_{be}$ of transistor 508 plus the voltage drop across resistor 514 appears at the base of transistor 506. Initially, capacitor 505 is discharged and, therefore, the base of transistor 507 is below that of transistor 506 causing transistor 507 to be off and transistor 506 to be on. As a result, collector current in transistor 502 flows through transistor 506 and becomes essentially the emitter current of transistor 509. Transistor 509 then forms a current mirror with transistors 602, 510, 504 and 511. Transistors 512 and 513 form a Darlington pair helper transistor to provide the base current for the current mirror.

The current through transistor 510 flows through resistor 514 and transistor 501 to ground. The resultant voltage drop across resistor 514 adds to the voltage at the emitter of transistor 508 raising the voltage level at the base of transistor 506. At the same time, the collector current of transistor 504, minus that of transistor 503, charges the capacitor 505, and the collector current of transistor 511 flows through resistor 515 turning on transistor 516. With transistor 516 turned on, output transistor 701 is inhibited from turning on irrespective of the presence of collector current in transistor 426.

Capacitor 505 will continue charging via the excess collector current of transistors 503 and 504 until it reaches a voltage equal to that on the base of transistor 506. An instant later, the base-emitter junction of transistor 506 becomes reverse-biased due to the reduced current of transistor 510, and the base-emitter junction of transistor 507 becomes forward-biased, thus switching transistor 507 on and transistor 506 off. The switching of these two transistors is aided by the split collector-transistor 517. Collector current of transistor 502 at this point flows through transistor 507 and the current mirror formed around transistor 509 is turned off. The addition of resistor 518 improves the turn-off characteristics of the mirror.

When transistors 507 and 506 switch states, immediately the base voltage of transistor 506 reduces by the voltage drop across resistor 514 to the original reference voltage level. Capacitor 505 then starts to discharge via the constant collector current of transistor 503. Also, the base drive to transistor 516 discontinues, thus turning it off. If a valid ringing signal has been detected as discussed earlier, transistor 426 will be supplying current to the output circuit means 700 so that when transistor 516 turns off, the current in transistor 426 serves to gate transistor 701 in the output circuit means 700 on. Thus, an inversion of the oscillator output voltage is achieved. Capacitor 505 then continues to discharge through transistor 503 until its voltage drops to the level of that on the base of transistor 506. At this time, transistor 507 turns off and transistor 506 turns on again powering the current sources mirrored around transistor 509. The base of transistor 506 returns to its former voltage level, capacitor 505 starts charging and the oscillation is repeated.

The frequency determining means 600 provides the option of having a frequency modulated type output signal by shifting the oscillating frequency of the oscillatory generator means 500 during the negative half cycles of the input ringing voltage. The circuit consists of transistors 601 through 604 and resistors 605 through 610. The frequency shift option is enabled by connecting the base of transistor 604 through resistor 610 and a switch such as 611 to line 102 in FIG. 2. Then on the negative-going cycles of the input signal, transistor 604 will be forward-biased which shunts base current away from transistor 601 turning it and transistor 603 off. This action allows transistor 602 to become part of the current mirror formed by transistor 509 causing current to be shunted away from transistor 510 through resistor 608 and transistor 602 to common. The result is a lower voltage appearing at the base of transistor 506 which, in turn, has the effect of decreasing the voltage to which capacitor 505 must charge to cause transistors 506 and 507 to switch states. This, in turn, decreases the time capacitor 505 charges and discharges and, thus, increases the frequency of the oscillator. For the remainder of the negative cycles of the input signal, transistor 602 will cause the collector current of transistor 510 to be reduced, thus causing the increased oscillating frequency. The value of resistor 608 is chosen to give an increased frequency that is a 5/4th musical relationship to the original frequency, yielding a pleasant sound. It should be noted that the duty cycles of both frequencies remain the same since the charge and discharge currents of capacitor 505 are unchanged. If the frequency shift option is not enabled, transistor 601 remains on keeping transistor 603 saturated. As a result, transistor 602 remains turned off, no current is shunted from transistor 510 and the oscillator maintains the original frequency.

The output circuit means 700 for the tone ringer is formed by transistors 701, 702 and resistor 703 connected in an equivalent silicon-controlled rectifier (SCR) combination. As discussed previously, when a valid ringing signal is recognized by the sensing means 400, a continuous current is supplied from the collector of transistor 426 to the output circuit means 700. Since by this time the oscillatory generator means 500 is running, transistor 516 will be switching on and off at the frequency and duty cycle of the oscillatory generator means. When transistor 516 is on, the gate current from transistor 426 will pass through its collector and, therefore, the equivalent SCR will be off. Conversely, when transistor 516 is off, the SCR will be on via current supplied by transistor 426.

The complete output circuit means 700 includes the transducer connection which obtains drive power through rectifier diode 205. Some smoothing of the rectified input signal voltage is provided by capacitor 705 so that the resulting voltage applied to the transducer is amplitude modulated with a modulation depth of about 40%; the amplitude-modulated input voltage thus provides an envelope to the pulse which drives the transducer. Resistors 706 through 709 form a volume control for the tone ringer. Diode 710 passes the reverse EMF generated by the decaying voltage through the inductance of the transducer 300.

Although a specific embodiment of the invention has been shown and described, it will be understood that it is but illustrative and various modifications may be made therein without departing from the scope and spirit of this invention as defined in the appended claims.

We claim:

1. A tone ringer operatively responsive to the reception of ringing signals over input lines, the ringer comprising
    an electroacoustic transducer (300) for producing an audible output,
    oscillatory generator means (500) for activating the electroacoustic transducer, characterized in that
    the tone ringer includes constant current generators (223, 224, 225, 226) for operation of the oscillatory generator means, and
    power conversion means (200) responsive to ringing signals across the input lines for supplying energy to the constant current generators and to the electroacoustic transducer, and for providing voltage reference levels to the oscillatory generator means, the constant current generators further comprising a plurality of transistors connected as current mirrors with their emitters connected through resistors to one or the other of a pair of output lines from the power conversion means.

2. The tone ringer in claim 1 further including sensing means for distinguishing between valid and invalid ringing signals applied across the input lines.

3. The tone ringer in claim 2 further including output circuit means (700) operatively responsive to the sensing means for providing a connecting path between the oscillatory generator means and the electroacoustic transducer.

4. The tone ringer circuit as in claim 3 wherein the output circuit means includes a first transistor (702) with its collector split into multiple portions and a second transistor (701), the first transistor having its emitter connected to a positive reference potential through the transducer and a first portion of its collector connected to the collector of the second transistor, the first transistor having a second collector portion connected to the base of the second transistor and to a negative reference potential through a resistor (703), the second transistor having its emitter also connected to the negative reference potential and the first transistor having its base connected to the collector of the second transistor along with the first collector portion of the first transistor.

5. The tone ringer in claim 3 wherein the sensing means comprise a plurality of constant current generators (401, 402, 403, 408, 409, 410, 412, 417) complementary disposed across output lines of the power conversion means for providing energy to the sensing means upon the power conversion means receiving an input voltage, the current generators activating a first transistor (415) or a second transistor (416) connected in a differential arrangement for respectively charging or discharging a capacitor (414) in response to the voltage provided by the power conversion means being above or below a first predetermined level, the current generators providing energy to a third transistor (425) and a fourth transistor (426) connected in a differential arrangement and having a turn-on state that is inverted with the capacitor charging above a second predetermined voltage level.

6. The tone ringer in claim 5 wherein the fourth transistor is coupled to the output circuit means providing an activation signal for selectively connecting the oscillatory generator means to the transducer.

7. The tone ringer in claim 6 wherein the sensing means further comprise latching means activated by the capacitor charging above the second predetermined voltage level, the latching means maintaining the activation signal for the output circuit means during the period that the ringing signal is present on the input lines.

8. The tone ringer in claim 7 wherein the latching means comprise a fifth transistor (413) and a sixth transistor (421) connected in a differential arrangement, the fifth transistor having its base connected to one of the multiple collector portions of the first transistor (415), the sixth transistor having its base connected to the third transistor (425) which is differentially arranged with the fourth transistor (426), the third transistor turning off and the fourth transistor turning on when the capacitor charges above the second predetermined voltage level, the emitters of the third and fourth transistors being commonly connected to a positive reference potential through a constant current generator (402) and the base of the fourth transistor being connected to the positive reference potential through a second constant current generator (403) and to the negative reference potential through the series combination of a voltage level shifter (427, 428, 429), a first resistor (431) and a second resistor (430), the collector of the third transistor being connected to the negative reference potential through the second resistor and the fourth transistor having its collector split into multiple portions, a first collector portion coupled to the output circuit means providing the activation signal thereto, a second collector portion coupled to the commonly connected base and collector of a seventh transistor (432) providing drive thereto, the seventh transistor forming a current mirror with an eighth transistor (433) which has its collector connected to the base of the first transistor, in combination, the turning on of the fourth transistor for providing a voltage reduction at the base of the first transistor, and the turning off of the third transistor for providing a voltage reduction on the base of the fourth transistor maintain the activation signal for the output circuit means.

9. The tone ringer in claim 7 wherein the oscillatory generator means comprise a single oscillator arrangement.

10. The tone ringer in claim 9 wherein the oscillatory generator means comprise a plurality of constant current generators (501, 502, 503, 504, 509, 510, 511) complementary disposed across output lines of the power conversion means for providing energy to the oscillatory generator means upon the power conversion means receiving an input voltage, the current generators providing power to a transistor pair (506, 507) connected in a differential arrangement and alternating in the active state at a frequency determined by a resistance capacitance network (505, 514), and a duty cycle determined by the ratio of two of the constant current generators (503, 504).

11. The tone ringer in claim 10 further including frequency determining means (600) connected to the oscillatory generator means for causing the oscillatory generator means to produce a fundamental frequency signal so long as the frequency determining means is in a first operating condition.

12. The tone ringer in claim 11 in which the frequency determining means is connected to the oscillatory generator means for causing the oscillatory generator means to produce a varying frequency signal so long as the frequency determining means is in a second operating condition.

13. A tone ringer operatively responsive to the reception of ringing signals over input lines, the ringer comprising
an electroacoustic transducer (300) for producing an audible output,
oscillatory generator means (500) for activating the electroacoustic transducer, characterized in that
the tone ringer further includes circuit means (700) operatively responsive to a valid ringing signal for providing a connecting path between the oscillatory generator means and the electroacoustic transducer, and
frequency determining means (600) connected to the oscillatory generator means for controlling a signal produced by the oscillatory generator means, the frequency determining means causing the oscillatory generator means to produce a fundamental frequency signal so long as the frequency determining means is in a first operating condition, and a varying frequency signal so long as the frequency determining means is in a second operating condition.

14. The tone ringer in claim 11 or 13 wherein the frequency determining means comprise in a first operating condition four transistors, the first transistor (603) having its emitter connected to a positive reference potential and its base also connected to the positive reference potential through a first resistor (607), the second transistor (602) having its base connected to the collector of the first transistor, its emitter connected to the positive reference potential through a second resistor (608) and a third resistor (519) connected in series, the third transistor (601) having its collector connected to the base of the first transistor and its emitter connected to a negative reference potential through a fourth resistor (605), the fourth transistor (604) having its emitter connected to the base of the third transistor and its collector connected to the negative reference potential for causing the oscillatory generator means to produce a fundamental frequency signal.

15. The tone ringer in claim 12 or 13 wherein the frequency determining means comprise in a second operating condition four transistors, the first transistor (603) having its emitter connected to a positive reference potential and its base also connected to the positive reference potential through a first resistor (607), the second transistor (602) having its base connected to the collector of the first transistor, its emitter connected to the positive reference potential through a second resistor (608) and a third resistor (519) connected in series, the third transistor (601) having its collector connected to the base of the first transistor and its emitter connected to a negative reference potential through a fourth resistor (605), the fourth transistor (604) having its emitter connected to the base of the third transistor, its collector connected to the negative reference potential and its base connected through a fifth resistor (610) to one of the input lines for causing the oscillatory generator means to produce a varying frequency signal.

16. The tone ringer in claim 13 wherein the oscillatory generator means comprise a single oscillator arrangement.

17. A circuit for receiving ringing signals over a telephone line, the circuit comprising sensing means (400) responsive to valid ringing signals received over the line and unresponsive to dialing pulses and transients received over the line characterized in that the sensing means comprise a first transistor (415) and a second transistor (416) connected in a differential arrangement, the first transistor or the second transistor activated for respectively charging or discharging a capacitor (414) in response to reception of a voltage reflective of the input ringing signal voltage being above or below a first predetermined voltage level, a third transistor (425) and a fourth transistor (426) connected in a differential arrangement operatively responsive to the state of the first transistor and second transistor and having a turn-on state that is inverted with the capacitor charging above a second predetermined voltage level, the valid ringing signal providing a voltage of a magnitude and duration for charging the capacitor above the second predetermined voltage level and the third transistor and fourth transistor providing an output activation signal only in response to reception of the valid ringing signal.

18. A tone ringer operatively responsive to the reception of ringing signals over input lines, the ringer comprising:

an electroacoustic transducer (300) for producing an audible output, oscillatory generator means (500) for activating the electroacoustic transducer, characterized in that the tone ringer includes constant current generators (223, 224, 225, 226) for operation of the oscillatory generator means, and power conversion means (200) responsive to ringing signals across the input lines for supplying energy to the constant current generators and to the electroacoustic transducer, and for providing voltage reference levels to the oscillatory generator means, the constant current generators further comprising a plurality of current mirrors connected to one or the other of a pair of output lines from the power conversion means.

* * * * *